United States Patent Office 3,484,465
Patented Dec. 16, 1969

3,484,465
BICYCLO[2.2.2]OCTANE - 1-CARBOXYLATE CARBONATE ESTERS OF ESTROGENIC STEROIDS
Alexander D. Cross, Mexico City, Mexico, and John H. Fried, Palo Alto, Calif., assignors to Syntex Corporation, Panama, Panama, a corporation of Panama
No Drawing. Filed Sept. 7, 1967, Ser. No. 665,953
Int. Cl. C07c 169/36, 167/28; A61k 17/00
U.S. Cl. 260—397.5       21 Claims

ABSTRACT OF THE DISCLOSURE

Bicyclo[2.2.2]octane - 1 - carboxylate, bicyclo[2.2.2]-octane - 1 - methylenecarbonate, and tricyclo[3.3.1.1$^{1,5}$] decane - 1 - methylenecarbonate esters of Ring A aromatic estrane steroids which esters are useful for their long-acting anti-fertility and estrogenic activity and processes for the preparation of these novel esters.

---

This invention relates to new and useful steroid esters. It more specifically pertains to novel and useful steroidal bicyclo[2.2.2]octane - 1 - carboxylate, bicyclo[2.2.2]octane - 1 - methylenecarbonate, and tricyclo[3.3.1.1$^{1,5}$] decane - 1 - methylenecarbonate esters as well as various molecularly modified derivatives thereof, the steroid nucleus thus bearing a novel group represented by the Formulas A, B, and C:

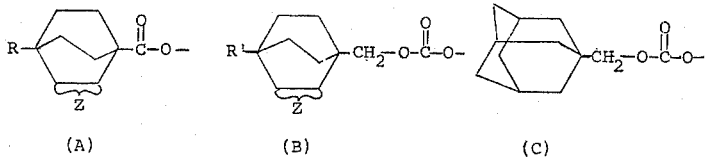

wherein, in each applicable formula, R is hydrogen, chloro, fluoro, trifluoromethyl, cyano, (lower)alkyloxy, acyloxy, (lower)alkyloxymethyl, acyloxymethyl, (lower) alkyl, or aryl; R' is identical in meaning to R, exclusive of cyano, acyloxy, and acyloxymethyl; and Z is a carbon-carbon single bond or a carbon-carbon double bond.

The novel steroid esters of the present invention are of the estrane series and are represented by the following Formula I:

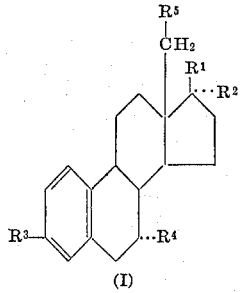

wherein R$^1$ is hydroxy and the conventional hydrolyzable esters thereof or a polycyclic group represented by one of the above Formulas A, B, and C;

R$^2$ is hydrogen, (lower)alkyl, (lower)alkenyl, (lower) alkynyl, halo(lower)alkynyl, or, when taken together with R$^1$, keto;

R$^3$ is hydroxy, (lower)alkyloxy, or a polycyclic group represented by one of the above Formulas A, B, and C;

R$^4$ is hydrogen or methyl;

R$^5$ is hydrogen or (lower)alkyl;

One of R$^1$ and R$^3$ being said polycyclic group.

The terms "(lower)alkyl" and derivations thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like. Representations of the (lower)alkenyl groups hereof are vinyl, propenyl, and the like, the (lower)alkynyl groups hereof are ethynyl, propynyl, and the like, and the halo(lower)alkynyl groups hereof are chloroethynyl, chloropropynyl, and the like.

The term "conventional hydrolyzable ester" as used herein denotes those hydrolyzable ester groups conventionally employed in the steroid art, preferably, those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

By the term "aryl" is inclined aryl, aralkyl, and alkaryl groups, such as phenyl, p-chlorophenyl, p-methoxyphenyl, benzyl, phenethyl, tolyl, ethylphenyl, and the like.

Thus included within the scope of the present invention are the novel steroid esters represented by the following Formulas I–a, I–b, I–c, I–d, I–e, and I–f:

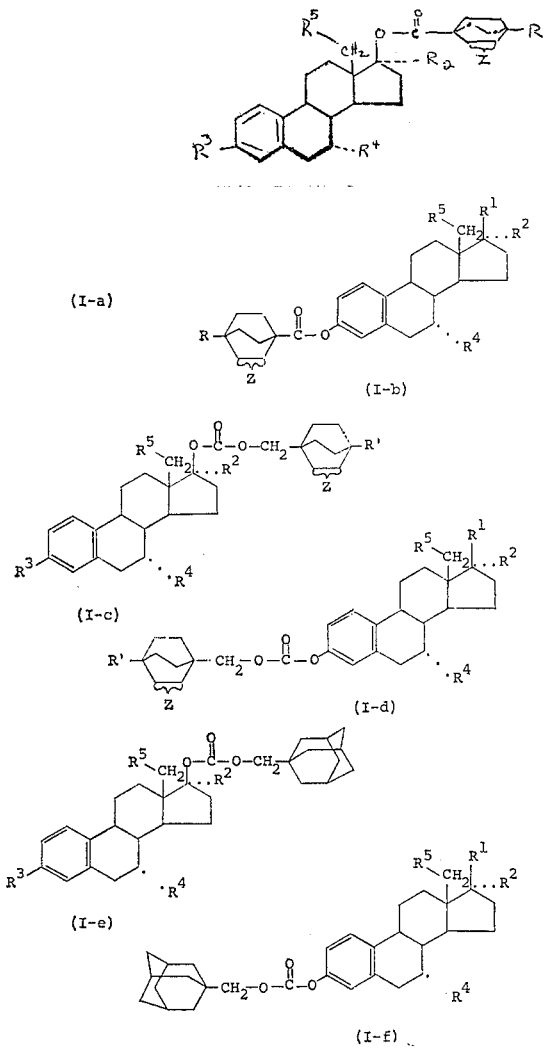

wherein, in each formula, each of R, R', R¹, R², R³, R⁴, R⁵, and Z is as hereinbefore defined.

It will be understood that the above represented compounds and the scope of the instant invention include the corresponding novel steroidal C–3,17 bisesters.

The novel polycyclic esters of this invention possess enhanced and long-acting anti-fertility and estrogenic activity. They are accordingly useful in the control and regulation of fertility and the management of various menstrual disorders.

These compounds are administered via the usual routes, whether orally or parenterally, either singly, in conjunction with other medicinal agents, or in pharmaceutically acceptable non-toxic compositions formed by the incorporation of any of the normally employed excipients. Dosage levels vary according to the particular affliction or condition being treated, its degree or severity, and the observed response to treatment but generally a daily dosage rate of from 0.1 mg. to 1 mg. per kilogram of body weight is satisfactory.

The novel steroid esters of the present invention are prepared via usual esterification reaction union of the polycyclic moiety with the steroid moiety, the specific procedures conditioned upon the particular ester prepared as hereinafter set forth in more detail.

The novel estrogen steroid bicyclic esters hereof which are represented above by Formulas I–a and I–b are prepared by esterifying the corresponding steroidal alcohol (hydroxy at C–3 and/or C–17) either with the acid halide or acid anhydride which otherwise correspond to the groups represented by Formula A, that is, a bicyclo[2.2.2]octan-1-oic acid halide (preferably, chloride), a bicyclo [2.2.2]octan-1-oic anhydride (preferably, (lower)alkanoic anhydrides), or the corresponding C–2 unsaturated and/or C–4 substituted derivatives thereof. Alternatively, the acid per se or the esters thereof can be so employed.

In the practice of the preferred aspects of the above preparation and except as qualified below for the mono C–3 addition, the reaction is conducted in the presence of base, such as is provided by an organic tertiary amine, for example, triethylamine, pyridine, and the like. The reaction is also conducted with an inert solvent, such as dioxane, tetrahydrofuran, diethyl ether, benzene, xylene, and the like with the reaction being carried out at temperatures of from about 0° C. to about 100° C. or higher upwards of 150° C. Temperatures below 0° C. may be employed depending mainly upon reactants and reaction choice.

The novel mono ester is introduced at C–17 by first bisesterifying the 3,17-diol by the above procedure followed by hydrolyzing the resultant compound under mild conditions, such as with acetic acid or methanolic sodium bicarbonate, to remove the C–3 ester group. Thereafter, the 3β-hydroxyl can be conventionally esterified to furnish the corresponding mixed ester derivatives.

Alternatively, the 3β-tetrahydropyran-2′-yloxy compound is esterified at C–17β to give the novel ester and the resultant compound hydrolyzed with acid to furnish the 3β-hydroxy derivative containing the novel ester group at the C–17β position.

The novel mono ester at C–3 is prepared by treating the 3-hydroxy compound with the bicyclo acid halide or anhydride in the presence of aqueous base solution, for example, aqueous sodium hydroxide solution, such as via the conditions of the Schotten-Baumann reaction. Thereafter, the 17β-hydroxy group, if present, can be conventionally esterified thus furnishing the corresponding mixed ester derivatives.

The bicyclo[2.2.2]octane- and bicyclo[2.2.2]oct-2-ene-1-carboxylic acid halides and anhydrides corresponding to Formula A are prepared from the corresponding free acid compounds by methods known per se as described, for example, in Wagner and Zook, Synthetic Organic Chemistry, John Wiley and Sons, Inc., New York (1953), p. 546 et seq. and p. 558 et seq., respectively.

The corresponding free carboxylic acid compounds from which the acid halides and acid anhydrides are formed are also prepared by known methods. One such method involves treating a 4-substituted or -unsubstituted cyclohexa - 1,3 - diene - 1 - carboxylic acid or -1 - carboxylate by the Diels-Alder addition of ethylene, such as according to the conditions set forth in U.S. Patent 3,081,334 to afford the corresponding 4-substituted or -unsubstituted bicyclo[2.2.2]octane - 1 - carboxylic acids. Thereafter, the thus obtained saturated acids can be dehydrogenated to the corresponding 4-substituted or -unsubstituted bicyclo[2.2.2]oct - 2 - ene - 1 - carboxylic acids. Other suitable methods for preparing these acids are set forth by Holtz et al., J. Am. Chem. Soc. 86, 5183 (1964); Kauer et al. J., Org. Chem. 30, 1431 (1965); Grob et al., Helv. Chim. Acta. 41, 1191 (1958); Roberts et al., J. Am. Chem. Soc. 75, 637 (1953); Belgium Patent 665,701; and Netherlands Patent 6,507,979.

The novel estrogen steriod bicyclo carbonate esters hereof which are represented above by Formulas I–c and I–d are prepared analogously to the methods operable for the preparation of the compounds of Formulas I–a and I–b as set forth above utilizing, instead, the appropriate steriodal alcohol with the chlorocarbonate (chloroformate) which otherwise correspond to the groups represented by Formula B, that is, a bicyclo[2.2.2] octane - 1 - methylene - chlorocarbonate or the corresponding C–2 unsaturated and/or C–4 substituted derivatives thereof.

The chlorocarbonate reactants are conveniently prepared via known procedures. First, the corresponding free carboxylic acid compound (obtained as set forth above) is conventionally reduced such as with a metal hydride, for example, lithium aluminum hydride, and the like, in inert solvent and the resultant alcohol (methylol) treated with phosgene such as according to the procedure described in Wagner and Zook, op. cit., p. 483 et seq.

The novel estrogen steroid tricyclic carbonate esters hereof which are represented above by Formulas I–e and I–f are prepared analogously to the methods set forth above for the preparation of the bicyclic carbonate esters with the substitution of the corresponding tricyclic chlorocarbonates (chloroformates) which otherwise correspond to the group represented by Formula C above, namely, a tricyclo[3.3.1.1$^{1,5}$]decane - 1 - methylenechlorocarbonate in lieu of the bicyclo derivatives.

This tricyclic chlorocarbonate compound is similarly prepared from tricyclo[3.3.1.1$^{1,5}$]decane - 1 - carboxylic acid, otherwise referred to as adamantane - 1 - carboxylic acid, upon conventional reduction as described above giving the corresponding alcohol (methylol) derivative followed by treatment thereof with phosgene as likewise mentioned supra.

The steroidal alcohol starting compounds are known in the art or can be prepared via processes known per se.

Thus, the C–17 position of estrone or 13-alkylestrones is elaborated by reduction with sodium borohydride or lithium aluminum hydride to the 17β-alcohol or by treating the 17-keto group with an organometallic, such as an alkyl lithium, alkenyl lithium, alkynyl lithium, or an alkyl magnesium halide, alkenyl magnesium halide, or alkynyl magnesium halide which provides the corresponding 17α-aliphatic-17β-ols. Complete or partial hydrogenation of the 17α-alkynyl group, such as ethynyl, alternatively provides the alkyl, such as ethyl, and alkenyl, such as vinyl, groups, respectively.

Conventional acylation of the thus produced C–17 hydroxyl is accomplished upon treatment with the appropriate acylating agent, such as acetic or other anhydride in pyridine for the secondary alcohols, and the corresponding acid chloride with acid catalyst for the tertiary hydroxy group.

Starting compounds bearing a 7α-methyl substituent are prepared according to the method of Kalvoda et al., Helvetica Chimica Acta. 50, 281 (1967).

The examples which follow are intended to merely illustrate the manner by which this invention can be practiced and therefore are not to be construed as limitations upon the overall scope hereof.

EXAMPLE 1

To a mixture of 2.5 g. of estra-1,3,5(10)-triene-3β,17β-diol in 10 ml. of a 10% aqueous sodium hydroxide solution is added 2.0 g. of bicyclo[2.2.2]octane-1-carboxylic acid chloride and the solution is shaked vigorously for ten to fifteen minutes. The reaction mixture is made slightly alkaline by the addition of sodium carbonate and is then diluted with water. It is then filtered, the precipitate being washed with water and dried to give 3β-(bicyclo [2.2.2]octane - 1' - carbonyloxy)estra - 1,3,5(10) - trien-17β-ol which is recrystallized from hot methanol.

Similarly, by following the above procedure upon substitution of the appropriate steroid alcohol and bicyclic acid halide, the following compounds are prepared:

3β-(bicyclo[2.2.2]oct-2'-ene-1'-carbonyloxy)-estra-1,3,5(10)-trien-17β-ol,
3β-(4'-methylbicyclo[2.2.2]octane-1'-carbonyloxy)-estra-1,3,5(10)-trien-17β-ol,
3β-(4'-methylbicyclo[2.2.2]oct-2'-ene-1'-carbonyloxy)-estra-1,3,5(10)-trien-17β-ol,
3β-(4'-methylbicyclo[2.2.2]octane-1'-carbonyloxy)-17α-methylestra-1,3,5(10)-trien-17β-ol,
3β-(4'-methylbicyclo[2.2.2]oct-2'-ene-1'-carbonyloxy)-estra-1,3,5(10)-trien-17α-ethyl-17β-ol,
3β-(4'-methylbicyclo[2.2.2]-octane-1'-carbonyloxy)-7α-methylestra-1,3,5(10)-trien-17β-ol,
3β-(4'-methylbicyclo[2.2.2]oct-2'-ene-1'-carbonyloxy)-7α-methylestra-1,3,5(10)-trien-17β-ol,
3β-(bicyclo[2.2.2]octane-1'-carbonyloxy)-7α-methyl-17α-ethynylestra-1,3,5(10)-trien-17β-ol,
3β-(bicyclo[2.2.2]oct-2'-ene-1'-carbonyloxy)-7α-methyl-17α-ethynylestra-1,3,5(10)-trien-17β-ol,
3β-(4'-methylbicyclo[2.2.2]octane-1'-carbonyloxy)-7α-methyl-17α-ethynylestra-1,3,5(10)-trien-17β-ol,
3β-4'-methylbicyclo[2.2.2]oct-2'-ene-1'-carbonyloxy)-7α-methyl-17α-ethynylestra-1,3,5(10)-trien-17β-ol,
3β-(4'-methylbicyclo[2.2.2]oct-2'-ene-1'-carbonyloxy)-17α-vinylestra-1,3,5(10)-trien-17β-ol,
3β-(bicyclo[2.2.2]octane-1'-carbonyloxy)-7α-methylestra-1,3,5(10)-trien-17β-ol,
3β-(4'-methylbicyclo[2.2.2]oct-2'-ene-1'-carbonyloxy)-18-methylestra-1,3,5(10)-trien-17β-ol,
3β-(4'-methylbicyclo[2.2.2]otcane-1'-carbonyloxy)-18-methylestra-1,3,5(10)-trien-17β-ol,
3β-(4'-methylbicyclo[2.2.2]octane-1'-carbonyloxy)-17α,18-dimethylestra-1,3,5(10)-trien-17β-ol,
3β-(4'-methylbicyclo[2.2.2]octane-1'-carbonyloxy)-7α,17α-dimethylestra-1,3,5(10)-trien-17β-ol,
3β-(4'-methylbicyclo[2.2.2]octane-1'-carbonyloxy)-17α-chloroethynylestra-1,3,5(10)-trien-17β-ol, and
3β-(4'-methylbicyclo[2.2.2]octane-1'-carbonyloxy)-estra-1,3,5-(10)-trien-17-one.

Upon substitution of the appropriate substituted acid chloride (as set forth in the third paragraph of Example 8 infra.) in lieu of the other bicyclo carboxylic acid chlorides employed herein, the corresponding C–3 mono ester of the corresponding starting steroid hydroxy compounds hereof are prepared.

EXAMPLE 2

By following the procedure set forth in the first paragraph of Example 1 hereof utilizing bicyclo[2.2.2]-octane-1-methylenechlorocarbonate in lieu of bicyclo[2.2.2]-octane-1-carboxylic acid chloride, there is prepared 3β-(bicyclo[2.2.2]octane - 1' - methylenecarbonyldioxy)-estra-1,3,5(10)-trien-17β-ol.

Siimlarly, the corresponding 3β-(bicyclo[2.2.2]-octane-1'-methylenecarbonyldioxy) esters otherwise corresponding to the other steroid compounds set forth in paragraph 2 of Example 1 above are prepared.

In like manner, upon substituting the other bicyclo methylenechlorocarbonates, prepared as set forth in Example 9, infra., the corresponding 3β-mono bicyclo[2.2.2] octane-1'-methylenecabonyldioxy esters of the above compound and those compounds set forth in Example 1 above are prepared.

EXAMPLE 3

By utilizing the procedure outlined in Example 2 using, instead, tricyclo[3.3.1.1$^{1,5}$]decane - 1-methylenechlorocarbonate, there is prepared 3β-(tricyclo[3.3.1$^{1,5}$]-decane-1'-methylenecarbonyldioxy)-estra-1,3,5(10)-trien-17β-ol.

Similarly, the corresponding 3β - (tricyclo[3.3.1.1$^{1,5}$]-decane-1'-methylenecarbonyldioxy) esters, otherwise corresponding to the other steroid compounds set forth in the second paragraph of Example 1 above, are prepared.

EXAMPLE 4

A mixture of 2.5 g. of estra-1,3,5(10)-trien-3β,17β-diol in 15 ml. of pyridine containing 4.0 g. of bicyclo [2.2.2] octane-1-carboxylic acid chloride is heated at steam bath temperature for about two hours. The mixture is then poured into ice water and the solid which forms collected by filtration, washed wih water, and dried yielding 3β, 17β - bis-(bicyclo[2.2.2]octane-1'-carbonyloxy)-estra-1,3, 5(10)-triene.

A mixture of 2.5 g. of estra-1,3,5(10)-triene-3β,17β-diol, 10 ml. of pyridine, 20 ml. of benzene, and 5.0 of 4-methylbicyclo[2.2.2]oct - 2-ene-1-carboxylic acid chloride is heated at reflux temperature for four hours. The mixture is then poured into ice water, the solid which forms is collected by filtration, washed with water, and dried to yield 3β,17β-bis-(4'-methylbicyclo[2.2.2]oct-2'-ene-1'-carbonyloxy)-estra-1,3,5(10)-triene.

Similarly, 3β,17β - bis-(bicyclo[2.2.2]oct-2'-ene-1'-carbonyloxy)-estra-1,3,5(10)-triene and 3β,17β-bis-(4'-methylbicyclo[2.2.2]octane-1' - carbonyloxy)-estra-1,3,5(10)-triene are prepared upon substitution of bicyclo[2.2.2]oct-2 - ene - 1-carboxylic acid chloride and 4-methylbicyclo[2.2.2]octane-1-carboxylic acid chloride, respectively, in the above procedures.

In like manner, the corresponding 3β,17β-bisesters of the other corresponding steroid hydroxy compounds set forth in the second paragraph of Example 1 above are prepared.

Upon substitution of the appropriate substituted acid chloride (as set forth in the third paragraph of Example 8) in lieu of either bicyclo[2.2.2]octane-1-carboxylic acid chloride or 4-methylbicyclo[2.2.2]oct-2-ene 1-carboxylic acid chloride in each of the procedures set forth above in the instant example, the corresponding C-3,17 bisesters of the corresponding starting steroid bis-hydroxy compounds hereof are prepared.

EXAMPLE 5

A mixture of 100 mg. of 3β,17β-bis-(bicyclo[2.2.2]-octane-1'-carbonyloxy)-estra-1,3,5(10)-triene and 100 mg. of sodium bicarbonate in 10 ml. of methanol and 3 ml. of water is refluxed for three hours. Thereafter, the methanol is evaporated under reduced pressure and the residue is extracted with ethyl acetate and water. Evaporation of the ethyl acetate from these extracts yields 17β-(bicyclo[2.2.2] - octane-1'-carbonyloxy)-estra-1,3,5(10)-trien-3β-ol which is collected by filtration and recrystallized from acetone:hexane.

Alternatively, the foregoing ester hydrolysis can be performed as follows.

A mixture of 100 mg. of 3β,17β-bis-(bicyclo[2.2.2]octane-1'-carbonyloxy) in a 70% aqueous acetic acid solution is refluxed for one hour and is then poured into ice water. This mixture is extracted with methylene chloride and the extracts are in turn washed with water to neutrality, dried over sodium sulfate, and evaporated to dryness to yield 17β-(bicyclo[2.2.2]octane-1'-carbonyloxy)-estra-1,3,5(10)-trien-3β-ol which can be recrystallized from acetone:hexane.

Similarly, by following the above procedures upon substitution of the appropriate bisester (prepared as described in Example 4), the following compounds can be prepared:

17β-(4'-methylbicyclo[2.2.2]octane-1'-carbonyloxy)-estra-1,3,5(10)-trien-3β-ol,
17β-(bicyclo[2.2.2]oct-2'-ene-1'-carbonyloxy)-estra-1,3,5(10)-trien-3β-ol,
17β-(4'-methylbicyclo[2.2.2]oct-2'-ene-1'-carbonyloxy)-estra-1,3,5(10)-trien-3β-ol,
17α-methyl-17β-(bicyclo[2.2.2]octane-1'-carbonyloxy)-estra-1,3,5(10)-trien-3β-ol,
17α-methyl-17β-(bicyclo[2.2.2]oct-2'-ene-1'-carbonyloxy)-estra-1,3,5(10)-trien-3β-ol,
17α-methyl-17β-(4'-methylbicyclo[2.2.2]octane-1'-carbonyloxy)-estra-1,3,5(10)-trien-3β-ol,
17α-methyl-17β(4'-methylbicyclo[2.2.2]oct-2'-ene-1'-carbonyloxy)-estra-1,3,5(10)-trien-3β-ol,
17α-ethyl-17β-(bicyclo[2.2.2]octane-1'-carbonyloxy)-estra-1,3,5(10)-trien-3β-ol,
17α-ethyl-17β-(bicyclo[2.2.2]oct-2'-ene-1'-carbonyloxy)-estra-1,3,5(10)-trien-3β-ol,
17α-ethyl-17β-(4'-methylbicyclo[2.2.2]octane-1'-carbonyloxy)-estra-1,3,5(10)-trien-3β-ol,
17α-ethyl-17β-(4'-methylbicyclo[2.2.2]oct-2'-ene-1'-carbonyloxy)-estra-1,3,5(10)-trien-3β-ol,
17α-vinyl-17β-(bicyclo[2.2.2]octane-1'-carbonyloxy)-estra-1,3,5(10)-trien-3β-ol,
17α-vinyl-17β-(bicyclo[2.2.2]oct-2'-ene-1'-carbonyloxy)-estra-1,3,5(10)-trien-3β-ol,
17α-vinyl-17β-(4'-methylbicyclo[2.2.2]octane-1'-carbonyloxy)-estra-1,3,5(10)-trien-3β-ol,
17α-vinyl-17β-(4'-methylbicyclo[2.2.2]oct-2'-ene-1'-carbonyloxy)-estra-1,3,5(10)-trien-3β-ol,
17α-ethynyl-17β(bicyclo[2.2.2]octane-1'-carbonyloxy)-estra-1,3,5(10)-trien-3β-ol,
17α-ethynyl-17β-bicyclo[2.2.2]oct-2'-ene-1'-carbonyloxy)-estra-1,3,5(10)-trien-3β-ol,
17α-ethynyl-17β-(4'-methylbicyclo[2.2.2]octane-1'-carbonyloxy)-estra-1,3,5(10)-trien-3β-ol,
17α-ethynyl-17β-(4'-methylbicyclo[2.2.2]oct-2'-ene-1'-carbonyloxy)-estra-1,3,5(10)-trien-3β-ol,
17α-chloroethynyl-17β-bicyclo[2.2.2]octane-1'-carbonyloxy)-estra-1,3,5(10)-trien-3β-ol,
17α-chloroethynyl-17β(bicyclo[2.2.2]oct-2'-ene-1'-carbonyloxy)-estra-1,3,5(10)-trien-3β-ol,
17α-chloroethynyl-17β-(4'-methylbicyclo[2.2.2]octane-1'-carbonyloxy)-estra-1,3,5(10)-trien-3β-ol,
17α-chloroethynyl-17β-(4'-methylbicyclo[2.2.2]oct-2'-ene-1'-carbonyloxy)-estra-1,3,5(10)-trien-3β-ol,
7α-methyl-17β-(bicyclo[2.2.2]octane-1'-carbonyloxy)-estra-1,3,5(10)-trien-3β-ol,
7α-methyl-17β-(bicyclo[2.2.2]oct-2'-ene-1'-carbonyloxy)-estra-1,3,5(10)-trien-3β-ol,
7α-methyl-17β-(44'-methylbicyclo[2.2.2]octane-1'-carbonyloxy)-estra-1,3,5(10)-trien-3β-ol,
7α-methyl-17β-(4'-methylbicyclo[2.2.2]oct-2'-ene-1'-carbonyloxy)-estra-1,3,5(10)-trien-3β-ol,
18-methyl-17β(bicyclo[2.2.2]octane-1'-carbonyloxy)-estra-1,3,5(10)-trien-3β-ol,
18-methyl-17β-(bicyclo[2.2.2]oct-2'-ene-1'-carbonyloxy)-estra-1,3,5(10)-trien-3β-ol,
18-methyl-17β-(4'-methylbicyclo[2.2.2]octane-1'-carbonyloxy)-estra-1,3,5(10)-trien-3β-ol,
18-methyl-17β-(4'-methylbicyclo[2.2.2]oct-2'-ene-1'-carbonyloxy)-estra-1,3,5(10)-trien-3β-ol,
7α,18-dimethyl-17β-(bicyclo[2.2.2]octane-1'-carbonyloxy)-estra-1,3,5(10)-trien-3β-ol,
7α,17α-dimethyl-17β-(4'-methylbicyclo[2.2.2]oct-2'-ene-1'-carbonyloxy)-estra-1,3,5(10)-trien-3β-ol,
7α-methyl-17α-ethynyl-17β-(bicyclo[2.2.2]oct-2'-ene-1'-carbonyloxy)-estra-1,3,5(10)-trien-3β-ol,
7α,18-dimethyl-17α-ethynyl-17β-(4'-methylbicyclo-[2.2.2]oct-2'-ene-1'-carbonyloxy)-estra-1,3,5(10)-trien-3β-ol, as well as the other corresponding derivatives containing the 7α-methyl group, the 18α-methyl group, the 17α-aliphatic groups, and/or combinations thereof.

Similarly, the corresponding 3β,17β-bis-bicyclocarbonate from the bicyclo carboxylic acid chlorides set forth in the third paragraph of Example 8, infra., are thus prepared.

The 17-mono esters substituted at the C-3 position by an alkyloxy or acyloxy grouping can be prepared by reducing the 17-ketone containing the alkyloxy or acyloxy substituent at C-3 and monoesterifying the 17β-hydroxyl thus obtained as described above.

EXAMPLE 6

Upon repeating the procedures set forth in the first two paragraphs of Example 4 above utilizing bicyclo-[2.2.2]octane-1-methylenechlorocarbonate in lieu of the bicyclo carboxylic acid chlorides therein employed, there is obtained 3β,17β-bis-(bicyclo[2.2.2]octane-1'-methylene-carbonyldioxy)-estra-1,3,5(10)-triene.

Similarly, the 3β,17β-bis-bicyclocarbonate esters of the other corresponding steroid hydroxy compounds set forth in the second paragraph of Example 1 above are prepared.

Upon substitution of the other bicyclo methylenechlorocarbonates prepared as set forth in Example 9, infra., there are prepared the corresponding 3β,17β-bis-bicyclocarbonate esters.

Upon subjecting these thus prepared bis-bicyclocarbonate esters to the hydrolytic procedure given in Example 5 above, there are prepared the corresponding 17β-mono-bicyclocarbonate esters.

Thus, for example, 17β-(bicyclo[2.2.2]octane-1′-methylenecarbonyldioxy) - estra - 1,3,5(10)-trien-3β-ol is prepared from estra-1,3,5(10)-triene-3β,17β-diol through the intermediate, 3β,17β-bis-(bicyclo[2.2.2]octane-1′-methylenecarbonyldioxy)-estra-1,3,5(10)-triene.

EXAMPLE 7

Analagous treatment, as set forth in Example 6 above, utilizing tricyclo[3.3.1.1¹,⁵]decane-1-methylenechlorocarbonate, affords, first, the corresponding 3β,17β-bis-tricyclocarbonate esters and, upon hydrolysis, the corresponding 17β-mono-tricyclocarbonate esters.

Thus, for example, 17β-tricyclo[3.3.1.1¹,⁵]decane-1′-methylenecarbonyldioxy) - estra - 1,3,5(10)-trien-3β-ol is prepared from estra-1,3,5(10)-triene-3β,17β-diol through the intermediate 3β,17β-bis-(tricyclo[3.3.1.1¹,⁵]decane-1′-methylenecarbonyldioxy)-estra-1,3,5(10)-triene.

EXAMPLE 8

A mixture of 10 g. of bicyclo[2.2.2]octane-1-carboxylic acid, 20 ml. of thionyl chloride in two drops of dimethylformamide, and about 40 ml. of benzene is heated at reflux temperature for about 2.5 hours. The resultant mixture is then fractionally distilled to give bicyclo[2.2.2]octane-1-carboxylic acid chloride.

A mixture of 15 g. of 4-methylbicyclo[2.2.2]oct-2-ene-1-carboxylic acid, 25 ml. of thionyl chloride, and a drop of dimethylformamide is heated at reflux temperature for about 1.5 hours. Fractional distillation of the reaction mixture gives 4-methylbicyclo[2.2.2]oct-2-ene-1-carboxylic acid chloride.

Similarly, upon the substitution of other bicyclo[2.2.2]octane-1-carboxylic acids and other bicyclo[2.2.2]oct-2-ene-1-carboxylic acids in the procedures set forth in the immediately preceding two paragraphs, there are obtained the following corresponding acid chlorides:

bicyclo[2.2.2]oct-2-ene-1-carboxylic acid chloride,
4-methylbicyclo[2.2.2]octane-1-carboxylic acid chloride,
4-phenylbicyclo[2.2.2]oct-2-ene-1-carboxylic acid chloride,
4-phenylbicyclo[2.2.2]octane-1-carboxylic acid chloride,
4-n-propylbicyclo[2.2.2]octane-1-carboxylic acid chloride,
4-n-propylbicyclo[2.2.2]oct-2-ene-1-carboxylic acid chloride,
4-ethylbicyclo[2.2.2]octane-1-carboxylic acid chloride,
4-ethylbicyclo[2.2.2]oct-2-ene-1-carboxylic acid chloride,
4-benzylbicyclo[2.2.2]octane-1-carboxylic acid chloride,
4-chlorophenylbicyclo[2.2.2]octane-1-carboxylic acid chloride,
4-chlorobicyclo[2.2.2]octane-1-carboxylic acid chloride,
4-chlorobicyclo[2.2.2]oct-2-ene-1-carboxylic acid chloride,
4-fluorobicyclo[2.2.2]octane-1-carboxylic acid chloride,
4-fluorobicyclo[2.2.2]oct-2-ene-1-carboxylic acid chloride,
4-trifluoromethylbicyclo[2.2.2]octane-1-carboxylic acid chloride,
4-trifluoromethylbicyclo[2.2.2]oct-2-ene-1-carboxylic acid chloride,
4-cyanobicyclo[2.2.2]octane-1-carboxylic acid chloride,
4-cyanobicyclo[2.2.2]oct-2-ene-1-carboxylic acid chloride,
4-acetoxybicyclo[2.2.2]octane-1-carboxylic acid chloride,
4-acetoxybicyclo[2.2.2]oct-2-ene-1-carboxylic acid chloride,
4-methoxybicyclo[2.2.2]octane-1-carboxylic acid chloride,
4-methoxybicyclo[2.2.2]oct-2-ene-1-carboxylic acid chloride,
4-methoxymethylbicyclo[2.2.2]octane-1-carboxylic acid chloride,
4-methoxymethylbicyclo[2.2.2]oct-2-ene-1-carboxylic acid chloride,
4-acetoxymethylbicyclo[2.2.2]octane-1-carboxylic acid chloride, and
4-acetoxymethylbicyclo[2.2.2]oct-2-ene-1-carboxylic acid chloride.

EXAMPLE 9

A solution of 1 g. of bicyclo[2.2.2]octane-1-carboxylic acid in 50 ml. of tetrahydrofuran is added over a 30 minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield bicyclo[2.2.2]octane-1-methylol which may be further purified through recrystallization from acetone:hexane.

Bicyclo[2.2.2]octane-1-methylol (15.5 g.) is slowly added with stirring to 15 g. of liquid carbonyl chloride (phosgene) contained in a reaction vessel immersed in a Dry Ice-trichloroethylene bath. During the addition, the temperature of the carbonyl chloride solution is kept at or below 0° C. After the addition is complete, the temperature of the solution is allowed to slowly rise to room temperature. The mixture is maintained at room temperature with stirring for from 10 to 15 hours, steps being taken to remove expelled carbonyl chloride. Thereafter, the reaction mixture is distilled under reduced pressure to give bicyclo[2.2.2]octane-1-methylenechlorocarbonate.

Similarly, the above procedures can be used to prepare the other C-2 unsaturated and/or C-4 substituted analogs thereof otherwise corresponding to the derivatives set forth in the third paragraph of Example 8 above, with the exception of the 4-cyano, 4-acyloxy, and 4-acyloxymethyl derivatives.

EXAMPLE 10

The procedure set forth in Example 9 is repeated substituting tricyclo[3.3.1.1¹,⁵]decane-1-carboxylic acid (adamantane-1-carboxylic acid) for bicyclo[2.2.2]octane-1-carboxylic acid thus giving tricyclo[3.3.1.1¹,⁵]decane-1-methylol initially and tricyclo[3.3.1.1¹,⁵]decane-1-methylenechlorocarbonate as a final product.

EXAMPLE 11

To a mixture of 10 g. of bicyclo[2.2.2]octane-1-carboxylic acid in a solution consisting of 25 ml. of ether and 10 ml. of pyridine is added a cold ether solution containing an equivalent molar quantity of acetyl chloride. The reaction mixture is allowed to stand at 0° C. for four hours and the resultant precipitate removed by filtration. The solution is washed with 25 ml. of concentrated hydrochloric acid, ice water, a 7% sodium hydroxide solution and again ice water. The washed solution is dried at 0° C. over sodium sulfate, filtered, and the ether evaporated to give bicyclo[2.2.2]octane-1-carboxylic acetyl anhydride which can be recrystallized from methanol.

Similarly, the other corresponding mixed anhydride starting compounds are analagously prepared.

These derivatives can be substituted for the corresponding acid chlorides employed in Example 1 with similar results.

EXAMPLE 12

A solution of 1 g. of sodium borohydride in 3 ml. of water is added to an ice cooled solution of 1 g. of estra-1,3,5(10)-trien-3β-ol-17-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield estra-1,3,5(10)-trien-3β,17β-diol which may be further purified by recrystallization from acetone:hexane.

A solution of 5 g. of estra-1,3,5(10)-trien-3β-ol-17-one in 250 ml. of thiophene-free benzene is treated with 27.5 ml. of 4 N methylmagnesium bromide in anhydrous ether. The mixture is heated at reflux under anhydrous conditions for three hours, cooled, and cautiously treated with excess aqueous ammonium chloride solution. This mixture is then extracted with ethyl acetate and these extracts are in turn washed with water, dried over sodium sulfate, and evaporated to dryness to yield 17α-methylestra-1,3,5(10)-trien-3β,17β-diol which is recrystallized from methylene chloride:hexane.

To a stirred solution of 2 g. of estra-1,3,5(10)-trien-3β-ol-17-one in 250 ml. of absolute ether is added in a dropwise fashion and under nitrogen, an ethereal solution of ten molar equivalents of ethyl lithium. The mixture is then stirred for 48 hours at room temperature, poured into water, acidified with hydrochloric acid, and stirred vigorously for one hour. The ethereal phase is separated, washed with water to neutrality, dried over sodium sulfate, and evaporated to dryness to yield 17α-ethylestra-1,3,5(10)-trien-3β,17β-diol which is further purified through recrystallization from acetone:hexane.

A solution of 1 g. of estra-1,3,5(10)trien-3β-ol-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate, and evaporated. Chromatography of the residue on alkaline alumina with 2:3 hexane:benzene yields 17α-ethynylestra-1,3,5(10)-trien-3β,17β-diol which is recrystallized from acetone:hexane.

A solution of 8.5 g. of 1,2-dichloroethylene in 50 ml. of anhydrous ether is added in a dropwise fashion, under nitrogen, and at 0° C. over a thirty minute period to a stirred solution of 15 ml. of 1.4 N methyl lithium in anhydrous ether. After stirring for an additional 90 minutes at room temperature, a solution of 0.5 g. of estra-1,3,5(10)-trien-3β-ol-17-one in 20 ml. of anhydrous ether is added in a dropwise fashion with stirring over a 15 minute period. Stirring at room temperature is continued for 18 hours and the reaction mixture is then poured into ice water and extracted with water. These extracts are washed with water, dried over sodium sulfate, and concentrated under reduced pressure. The residue is chromatographed on alkaline alumina with 8:2 hexane:ether to yield 17α - chloroethynylestra-1,3,5(10)-trien-3β,17β-diol which may be recrystallized from methanol.

A solution of 1 g. of 17α-ethynylestra-1,3,5(10)-triene-3β,17β-diol in 40 ml. of pyridine is hydrogenated at 25° C./atmospheric pressure in the presence of 0.4 g. of Lindlar catalyst. When 1.1 molar equivalents of hydrogen are absorbed the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 17α-vinylestra-1,3,5(10)-triene-3β,17β-diol which is further purified through recrystallization from acetone.

A solution of 3 g. of 17α-ethynylestra-1,3,5(10)-triene-3β,17β-diol in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure is recrystallized from acetone.

Similarly the foregoing elaboration procedures can be performed upon starting compounds already bearing a to yield 17α-ethylestra-1,3,5(10)-triene-3β,17β-diol which 7α-methyl and/or 18-methyl group.

EXAMPLE 13

A mixture of 1 g. of 3β-(bicyclo[2.2.2]octane-1′-carbonyloxy)-estra-1,3,5(10)-trien-17β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3β-(bicyclo[2.2.2]octane - 1′ - carbonyloxy)-17β-acetoxyestra-1,3,5(10)-triene which may be further purified through recrystallization from acetone:hexane.

A mixture of 2 g. of 3β-(4′-methylbicyclo[2.2.2]-oct-2′-ene-1′-carbonyloxy)-estra - 1,3,5(10)-trien-17β-ol in 8 ml. of pyridine and an equimolar amount of benzoyl chloride is heated at steam bath temperatures for thirty minutes. The mixture is then poured into ice water and the solid which forms is collected by filtration, washed with water, and dried to yield 3β-(4′-methylbicyclo[2.2.2]oct - 2′ - ene-1′-carbonyloxy)-17β-benzoyloxyestra-1,3,5(10)-triene which is further purified through recrystallization from methylene chloride:hexane.

A mixture of 2 g. of 3β-bicyclo[2.2.2]oct-2′-ene-1′-carbonyloxy)-estra - 1,3,5(10)-trien-17β-ol in 8 ml. of pyridine and 4 ml. of adamantoyl chloride is heated at steam bath temperatures for one hour. The mixture is then poured into ice water and the solid which forms is collected by filtration, washed with water, and dried to yield 3β-(bicyclo[2.2.2]oct - 2′ - ene-1′-carbonyloxy)-17β-adamantoyloxyestra-1,3,5(10)-triene which is further purified through recrystallization from methylene chloride:hexane.

Similarly, the other conventional hydrolyzable esters can also be thus inserted at the 17β position utilizing any of the enumerated compounds prepared as outlined in Example 1 and referenced in Examples 2 and 3 above.

In like manner, the 3β-hydroxy compounds bearing a novel mono ester group at C–17, which compounds are prepared in accordance with the procedures set forth in Examples 4 and 5 and referenced in Examples 6 and 7, can also be so acylated as herein described.

To a suspension of 5 g. of estra-1,3,5(10)-trien-3β-ol-17-one in 25 ml. of acetone is added a solution of 70 g. of potassium hydroxide in 37.5 ml. of water and the stirred mixture is treated dropwise with 10 ml. of dimethyl sulfate. The mixture is stirred for an additional 45 minutes and then poured into dilute hydrochloric acid. The solid which forms is collected by filtration and dried to yield 3β-methoxyestra-1,3,5(10)-trien-17-one which is recrystallized from chloroform:methanol.

Similarly, the other 3β-alkyl ethers hereof are analogously prepared.

What is claimed is:

1. Compounds of the formula

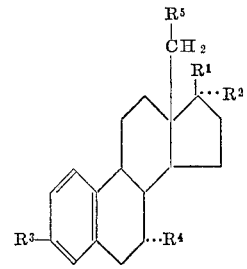

wherein R¹ is hydroxy and the conventional hydrolyzable esters thereof or a polycycle group represented by one of formulas:

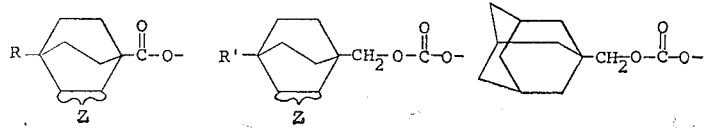

in which R is hydrogen, chloro, fluoro, trifluoromethyl, cyano, (lower)alkyloxy, acyloxy, (lower)alkyloxymethyl, acyloxymethyl, (lower)alkyl, or aryl; R' is identical in meaning to R, exclusive of cyano, acyloxy, and acyloxymethyl; and Z is a carbon-carbon single bond or a carbon-carbon double bond;

$R^2$ is hydrogen, (lower)alkyl, (lower)alkenyl, (lower)alkynyl, halo(lower)alkynyl, or, when taken together with $R^1$, keto;

$R^3$ is hydroxy, (lower)alkyloxy or a polycyclic group represented by one of formulas:

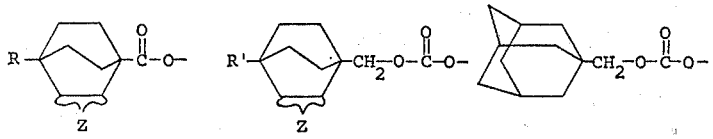

in which each of R, R', and Z is as already defined;
$R^4$ is hydrogen or methyl;
$R^5$ is hydrogen or (lower)alkyl;
One of $R^1$ and $R^3$ being said polycyclic group.

2. Compounds according to claim 1 wherein $R^3$ is one of said polycyclic groups.

3. Compounds according to claim 1 wherein $R^1$ is one of said polycyclic groups.

4. A compound according to claim 3 wherein $R^1$ is the group

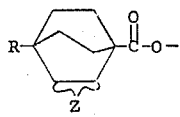

in which R is hydrogen and Z is a carbon-carbon single bond; $R^2$ is hydrogen, $R^3$ is hydroxy, $R^4$ is hydrogen, and $R^5$ is hydrogen.

5. A compound according to claim 3 wherein $R^1$ is the group

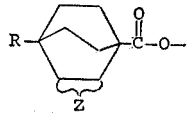

in which R is hydrogen and Z is a carbon-carbon single bond; $R^2$ is ethynyl, $R^3$ is hydroxy, $R^4$ is hydrogen, and $R^5$ is hydrogen.

6. A compound according to claim 3 wherein $R^1$ is the group

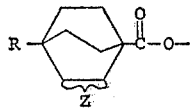

in which R is methyl and Z is a carbon-carbon single bond; $R^2$ is hydrogen, $R^3$ is hydroxy, $R^4$ is hydrogen, and $R^5$ is hydrogen.

7. A compound according to claim 3 wherein $R^1$ is the group

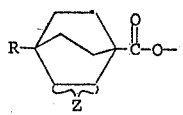

in which R is methyl and Z is a carbon-carbon single bond; $R^2$ is ethynyl, $R^3$ is hydroxy, $R^4$ is hydrogen, and $R^5$ is hydrogen.

8. A compound according to claim 3 wherein $R^1$ is the group

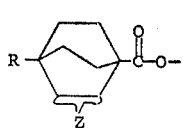

in which R is hydrogen and Z is a carbon-carbon double bond; $R^2$ is hydrogen, $R^3$ is hydroxy, $R^4$ is hydrogen, and $R^5$ is hydrogen.

9. A compound according to claim 3 wherein $R^1$ is the group

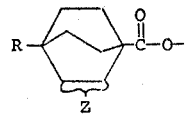

in which R is hydrogen and Z is a carbon-carbon double bond; $R^2$ is ethynyl, $R^3$ is hydroxy, $R^4$ is hydrogen, and $R^5$ is hydrogen.

10. A compound according to claim 3 wherein $R^1$ is the group

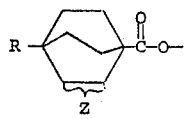

in which R is methyl and Z is a carbon-carbon double bond; $R^2$ is hydrogen, $R^3$ is hydroxy, $R^4$ is hydrogen, and $R^5$ is hydrogen.

11. A compound according to claim 3 wherein $R^1$ is the group

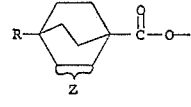

in which R is methyl and Z is a carbon-carbon double bond; $R^2$ is ethynyl, $R^3$ is hydroxy, $R^4$ is hydrogen, and $R^5$ is hydrogen.

12. A compound according to claim 3 wherein $R^1$ is the group

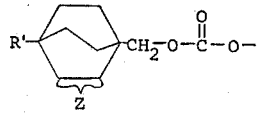

in which R' is hydrogen and Z is a carbon-carbon single bond; $R^2$ is hydrogen, $R^3$ is hydroxy, $R^4$ is hydrogen, and $R^5$ is hydrogen.

13. A compound according to claim 3 wherein $R^1$ is the group

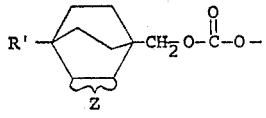

in which R' is hydrogen and Z is a carbon-carbon single bond; $R^2$ is ethynyl, $R^3$ is hydroxy, $R^4$ is hydrogen, and $R^5$ is hydrogen.

14. A compound according to claim 3 wherein $R^1$ is the group

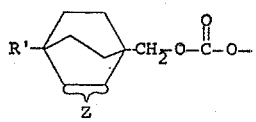

in which R' is methyl and Z is a carbon-carbon single bond; $R^2$ is hydrogen, $R^3$ is hydroxy, $R^4$ is hydrogen, and $R^5$ is hydrogen.

15. A compound according to claim 3 wherein $R^1$ is the group

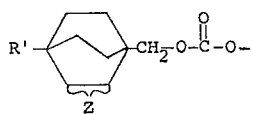

in which R' is methyl and Z is a carbon-carbon single bond; $R^2$ is ethynyl, $R^3$ is hydroxy, $R^4$ is hydrogen, and $R^5$ is hydrogen.

16. A compound according to claim 3 wherein $R^1$ is the group

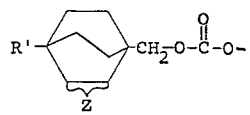

in which R' is hydrogen and Z is a carbon-carbon double bond; $R^2$ is hydrogen, $R^3$ is hydroxy, $R^4$ is hydrogen, and $R^5$ is hydrogen.

17. A compound according to claim 3 wherein $R^1$ is the group

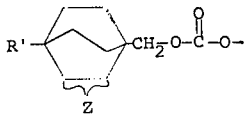

in which R' is hydrogen and Z is a carbon-carbon double bond; $R^2$ is ethynyl, $R^3$ is hydroxy, $R^4$ is hydrogen, and $R^5$ is hydrogen.

18. A compound according to claim 3 wherein $R^1$ is the group

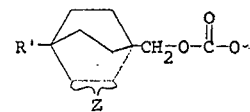

in which R' is methyl and Z is a carbon-carbon double bond; $R^2$ is hydrogen, $R^3$ is hydroxy, $R^4$ is hydrogen, and $R^5$ is hydrogen.

19. A compound according to claim 3 wherein $R^1$ is the group

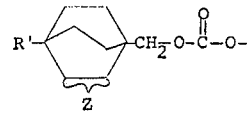

in which R' is methyl and Z is a carbon-carbon double bond; $R^2$ is ethynyl, $R^3$ is hydroxy, $R^4$ is hydrogen, and $R^5$ is hydrogen.

20. A compound according to claim 3 wherein $R^1$ is the group

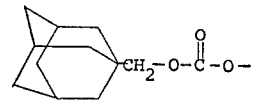

$R^2$ is hydrogen, $R^3$ is hydroxy, $R^4$ is hydrogen, and $R^5$ is hydrogen.

21. A compound according to claim 3 wherein $R^1$ is the group

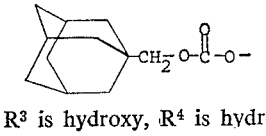

$R^2$ is ethynyl, $R^3$ is hydroxy, $R^4$ is hydrogen, and $R^5$ is hydrogen.

No references cited.

ELBERT L. ROBERTS, Primary Examiner

U.S. Cl. X.R.

260—239.55, 999